(12) United States Patent
Narkilahti et al.

(10) Patent No.: US 7,734,297 B1
(45) Date of Patent: Jun. 8, 2010

(54) METHOD AND SYSTEM FOR DETERMINING OPERATING MODES OF USERS OF A TELECOMMUNICATION SYSTEM

(75) Inventors: Kimmo Narkilahti, Helsinki (FI); Hannu Pahkala, Pirkkala (FI); Petteri Putkiranta, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 10/018,502

(22) PCT Filed: May 10, 1999

(86) PCT No.: PCT/FI99/00384

§ 371 (c)(1),
(2), (4) Date: Feb. 11, 2002

(87) PCT Pub. No.: WO00/69194

PCT Pub. Date: Nov. 16, 2000

(51) Int. Cl.
*H04W 72/00* (2009.01)
(52) U.S. Cl. ............... 455/452.2; 455/450; 455/452.1; 455/509; 455/512; 455/436; 370/331; 370/352
(58) Field of Classification Search ....... 455/450–452.2, 455/423, 425, 414.1–414.3, 453, 412.1, 466, 455/456.1–456.6, 509–513, 436–442; 705/1, 705/14; 725/86–87; 379/114.01–114.05; 340/7.21; 370/328–333, 468, 352–356
See application file for complete search history.

(56) References Cited

U.S. PATENT DOCUMENTS

| | | | | |
|---|---|---|---|---|
| 3,806,804 A | * | 4/1974 | Mills et al. .................. 455/509 |
| 5,497,504 A | * | 3/1996 | Acampora et al. ........... 455/436 |
| 5,623,495 A | * | 4/1997 | Eng et al. ................... 370/397 |
| 6,094,573 A | * | 7/2000 | Heinonen et al. ........ 455/412.1 |
| 6,115,611 A | * | 9/2000 | Kimoto et al. ........... 455/456.3 |
| 6,167,261 A | * | 12/2000 | Amin ...................... 455/426.1 |

(Continued)

FOREIGN PATENT DOCUMENTS

GB      2 327 175      1/1999

(Continued)

*Primary Examiner*—Sharad Rampuria
(74) *Attorney, Agent, or Firm*—Squire, Sanders & Dempsey, LLP

(57) ABSTRACT

The invention relates to a method for defining the patterns of behaviour of users of a telecommunication system on the basis of information collected from the telecommunication system, in which method at least one variable or a combination of variables of the telecommunication system is defined, user-specific information corresponding to the defined at least one variable or a combination of variables is filtered from the information collected from the telecommunication system, and the users of the telecommunication system are divided into classes of behaviour patterns on the basis of said filtered user-specific information. In addition, the invention relates to a system for defining the behaviour patterns of users of a telecommunication system, which system comprises means (51) for defining at least one variable or a combination of variables of the telecommunication system, filtering means (53) for filtering said user-specific information corresponding to at least one variable or a combination of variables from the information received from the telecommunication system, and classifying means (55) for classifying the users of telecommunication system on the basis of said filtered user-specific information.

24 Claims, 3 Drawing Sheets

U.S. PATENT DOCUMENTS

| | | | |
|---|---|---|---|
| 6,275,695 B1 * | 8/2001 | Obhan | 455/423 |
| 6,317,718 B1 * | 11/2001 | Fano | 705/1 |
| 6,400,954 B1 * | 6/2002 | Khan et al. | 455/450 |
| 6,526,580 B2 * | 2/2003 | Shimomura et al. | 725/63 |
| 6,560,460 B1 * | 5/2003 | Horneman et al. | 455/452.2 |
| 6,829,482 B2 * | 12/2004 | Rune et al. | 455/442 |
| 6,850,764 B1 * | 2/2005 | Patel | 455/450 |
| 6,985,746 B2 * | 1/2006 | Gorsuch | 455/456.3 |
| 7,277,446 B1 * | 10/2007 | Abi-Nassif et al. | 370/412 |
| 7,406,315 B2 * | 7/2008 | Uhlik et al. | 455/452.1 |
| 7,496,072 B2 * | 2/2009 | Proctor, Jr. | 370/332 |
| 7,551,937 B2 * | 6/2009 | Kim et al. | 455/509 |
| 2002/0077130 A1 * | 6/2002 | Owensby | 455/466 |
| 2003/0045297 A1 * | 3/2003 | Dent | 455/450 |
| 2004/0077366 A1 * | 4/2004 | Panasik et al. | 455/514 |
| 2005/0028194 A1 * | 2/2005 | Elenbaas et al. | 725/32 |
| 2005/0227739 A1 * | 10/2005 | Dowling et al. | 455/566 |

FOREIGN PATENT DOCUMENTS

| | | | |
|---|---|---|---|
| GB | 2327175 A | * | 1/1999 |
| JP | 10256982 A | | 9/1998 |
| WO | WO 98/30045 | | 7/1998 |

* cited by examiner

METHOD AND SYSTEM FOR DETERMINING OPERATING MODES OF USERS OF A TELECOMMUNICATION SYSTEM

PRIORITY CLAIM

This is a U.S. national stage of PCT application No. PCT/FI99/00384, filed on May 10, 1999.

FIELD OF THE INVENTION

The invention relates to a method according to the preamble of claim 1 for determining the behaviour patterns of users of a telecommunication system.

The invention also relates to a system according to the preamble of claim 13 for determining the behaviour patterns of users.

BACKGROUND OF THE INVENTION

From the point of view of a beginning telecommunication system operator, such as a mobile phone operator, the focus is on increasing the coverage and capacity of the system. When a sufficient level has been reached in these areas, the operators begin to pay more attention to improving the quality of service. An important factor in quality improvement is to optimize the properties of the system for the needs of the users. In order to achieve this, the operator must get information both about the performance of its system and the behaviour of its users.

In FIG. 1, the operation of the mobile communication system 10 is shown as a simplified diagram. The system 10 in FIG. 1 comprises a base station 12, a mobile services switching centre (MSC) 13, a network management system (NMS) 14, a customer register 15 and a statistics unit 16. When the mobile station 11 is used, a connection is established between the mobile station 11 and the base station 12. Via the base station 12, the connection is transmitted to the MSC 13, which establishes a connection between the mobile station 11 and the intended destination. Information about the connection, the type of service offered and its duration is transmitted from the MSC to the customer register 15, in which the information is saved for invoicing.

By means of the network management system 14, the operation of both the MSC 13 and the whole mobile communication system 10 is monitored and also managed, when required. Information collected by the network management system 14 can be saved in the statistics unit 16 for statistical reference.

FIG. 2 is a flow chart of a prior art method 20, in which statistical material is collected for the needs of the system operator. The method 20 is based on examination of the statistical material about the use of a mobile communication system 10 received from the statistics unit 16. In a method like this it can be examined, for example, how large a proportion of the attempts to establish a connection succeeded in the area of each base station, or what the average duration of the connections in the system is.

In the first step 21 of the method 20, the parameter to be examined is defined. The information is collected in the second step 22. In the third step 23 of the method, the value of the parameter is added to the statistics, whereafter the process returns to step 22 for collecting more information, when needed. When the statistical data collected are regarded as sufficient, statistical analysis is carried out in step 24.

By carrying out statistical analyses, the method 20 described above can be used to calculate parameters essential for the mobile communication system from the statistical material obtained from the system, which parameters can then be used for optimizing the system, for example. However, the statistical quantities received from the use of the mobile communication system do not identify the users, but the statistics are compiled on the basis of measurable system parameters, and these parameters are not individualized by users.

FIG. 3 shows another prior art method, by which statistical material is collected for the use of the system operator. The method is built on the method 20 depicted above in FIG. 2, complemented with the method 30 based on a customer survey. The purpose of the customer survey is to find individual differences between users and to group the users according to their patterns of behaviour.

The parameter to be examined in the survey is defined in the first step 31, after which the actual customer survey 32 and compilation of statistics 33 is carried out. The statistical material received from the customer survey can be combined with the statistical material received from the mobile communication system by the first method 20, after which statistical analysis 24 is carried out on the combined material.

The prior art methods entail the problem that there is not a clear connection between the users and the parameters of the mobile communication system. Statistically it is possible to make comparisons between the statistical materials received with different methods and to try to connect the values of certain parameters measured from the system to certain classes of behaviour patterns of users defined on the basis of the customer survey. However, there is no certain connection between the classes of behaviour patterns and the parameters calculated from the operation of the system, because a certain user or class of behaviour pattern cannot be unambiguously combined with the quantities measured from the system.

Furthermore, the solution based on a prior art customer survey with questionnaires entails the problem of the reliability of questionnaire surveys in general. In practice, the person who carries out the survey does not have full certainty of to what extent the material collected with a customer survey really reflects the real situation and how much the personal opinions or assumptions of the users have influenced the results of the survey. For this reason, the best application of questionnaire surveys is in charting the opinions and expectations of users.

SUMMARY OF THE INVENTION

It is the objective of this invention to provide a new method for charting the users' patterns of behaviour and a telecommunication system by means of which the problems of the prior art described above can be eliminated. The method according to the invention is characterized in what is set forth in the characterizing part of claim 1. The system according to the invention is characterized in what is set forth in the characterizing part of claim 13. Preferred embodiments of the invention are described in the dependent claims.

In the method according to the invention, at least one variable or a combination of variables of a telecommunication system, such as a mobile communication system, is defined, user-specific information corresponding to at least one variable or a combination of variables is filtered from the information collected from the telecommunication system, and the users of the telecommunication system are divided into at least one class of behaviour patterns on the basis of the filtered user-specific information.

The system according to the invention comprises means for defining at least one variable or a combination of variables of a telecommunication system, filtering means for filtering user-specific information corresponding to at least one variable or a combination of variables from the information received from a telecommunication system, and classification means for classifying the users of a telecommunication system on the basis of the filtered user-specific information.

In one embodiment of the method according to the invention, the user-specific information is filtered from the telecommunication system in real time.

In one embodiment of the method according to the invention, the user-specific information is saved for later analysis.

In one embodiment of the method according to the invention, statistical analysis is carried out on the classified information.

In one embodiment of the method according to the invention, the classes of behaviour patterns are defined in advance.

In one embodiment of the method according to the invention, the definitions of the classes of behaviour patterns are changed, after which the filtered information can be classified again using the new classes of behaviour patterns.

In one embodiment of the method according to the invention, the at least one variable is the user's type of contract.

In one embodiment of the method according to the invention, the at least one variable is the type of system service.

In one embodiment of the system according to the invention, the system is designed to process the information received from the telecommunication system in real time.

In one embodiment of the system according to the invention, the system has a memory for saving the filtered user-specific information.

In one embodiment of the system according to the invention, the system has analysis means for statistical analysis of the classes of behaviour patterns received from the classification means and/or for defining new classes of behaviour patterns.

In one embodiment of the system according to the invention, the system has regulating means for regulating the values of the parameters essential for the quality of service of the telecommunication system on the basis of the information received from the analysis means.

The advantage of the method and system according to the invention as compared to the prior art solution is the fact that they enable connecting the behaviour patterns of users unambiguously to the quantities describing the operation of the telecommunication system, which improves the possibilities of the system operator to optimize the functions of the telecommunication system to meet the real needs of the users.

The solution according to the invention also provides the advantage that the classes of behaviour patterns of users can be defined more easily and more extensively than before, because quantities describing the operation of the system can also be used in the classification.

BRIEF DESCRIPTION OF THE DRAWINGS

In the following, the invention will be described in more detail with reference to the accompanying drawings, in which.

DETAILED DESCRIPTION OF THE PRESENTLY PREFERRED EMBODIMENTS

Figure 1:
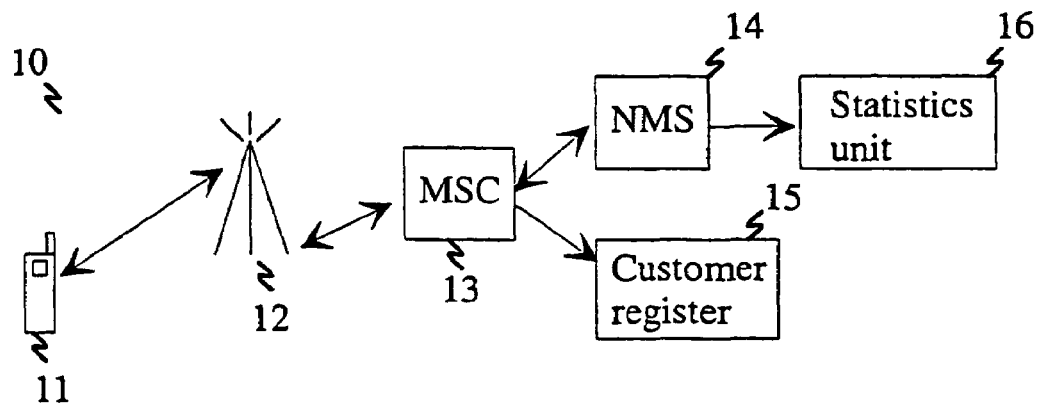
FIG. 1 illustrates the principle of the mobile communication system.
Figure 2:
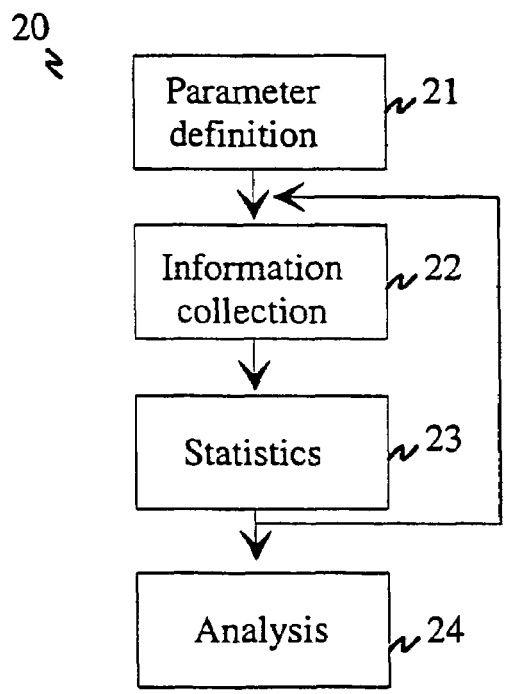
FIG. 2 depicts a prior art method for collecting statistical material from the mobile communication system.
Figure 3:
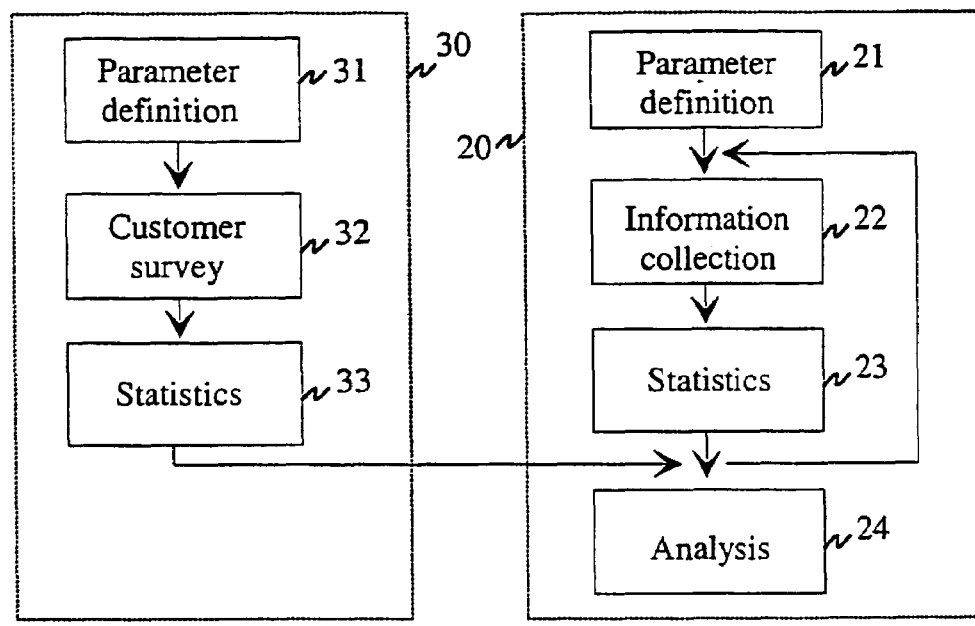
FIG. 3 depicts another prior art method for collecting statistical material from the mobile communication system.

FIGS. 1, 2 and 3 have been dealt with above in connection with the description of the prior art.

The solution according to the invention makes use of the fact that the users of the telecommunication system, the subscribers, can be identified via the customer register, for example. This enables individualizing the events of the telecommunication system or the measurements related to the events of the system. For example, when a phone call made in a mobile communication system is transferred from one base station to another by means of channel switching between the base stations, besides registering the channel switching, it is also possible to register the user of the mobile phone by taking advantage of individual identifiers. By registering also an individual identifier from all the channel switches between base stations, the users can be classified into groups according to the channel switches between base stations. This provides the system operator new information about the users of the system, their mobility and its requirements for the system.

Figure 4:
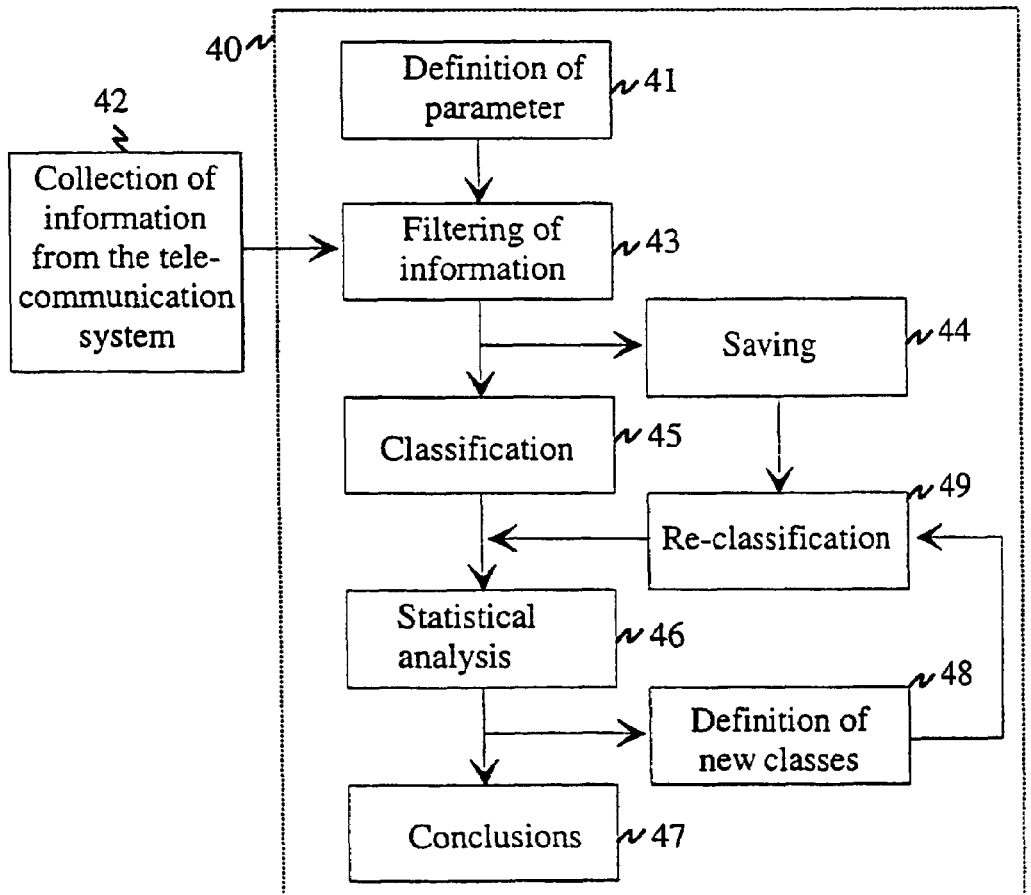
FIG. 4 depicts a method according to the invention for determining the behaviour patterns of users of a telecommunication system.

FIG. 4 is a flow chart about a solution based on the method according to the invention for determining the classes of the users' behaviour patterns. The first step 41 of the method is to define the parameter to be examined, such as the number of channel switches between base stations in a mobile communication system.

The second step 43 of the system is to filter user-specific information according to the parameter defined in the first step 41 from the information collected from the telecommunication system 42. In the second step 43, this information together with the user-specific identifier is separated from other information received from the mobile communication system. If other information is collected at the same time for some other purpose, several different filterings can be carried out in step 43.

The filtering carried out in the second step 43 of the method need not be a mere separation of information from a wider flow, but it can also be used for carrying out more complicated processing of information. For example, the information to be filtered can be the average number of channel switches between base stations in a certain period of time, whereby the averaging of the information in a certain period of time also takes place in the second step 43.

The filtering of information can be arranged so, for instance, that the information to be filtered is real-time information received from the mobile communication system.

That would make it possible to follow the behaviour of the users of the telecommunication system in real time.

Filtering the information needed from the information flow to be examined is essential for reducing the amount of information to be processed. For example, in the mobile phone network being examined the information path can be a 10 Mbit/s bus, which can typically transmit several megabits of information per second. Although it is advisable to follow the whole information flow in real time, it is not sensible to save the whole amount of information, because it would require a huge amount of saving capacity. Therefore it is more sensible to start by filtering only the information needed from the information flow and save only the essential information thus received.

The filtered user-specific information received in the second step 43 of the method according to the invention can be saved in step 44 for later processing or used in the third step 45 of the method for classifying the users into different classes of behaviour patterns, if these classes have been defined in advance. For instance, users whose average frequency of channel switching between base stations exceeds a certain predetermined value, are classified as high-mobility users, and users whose average frequency of channel switching between base stations is below another predetermined value, are classified as low-mobility users.

After the classification which took place in the third step 45 of the method, statistical analysis 46 can be carried out on the classified material. On the basis of the results, the system operator can then draw conclusions 47 about the regulation of parameters essential for improving the quality of service of the system.

If the classes of behaviour patterns have not been defined in advance, or the statistical analysis 46 indicates that there is a need to define new classes of behaviour patterns, the new classes of behaviour patterns can be defined 48 on the basis of the statistical analysis 46 carried out on the filtered user-specific information. When the new classes of behaviour patterns have been defined, the filtered user-specific information must be classified again. For carrying out the reclassification 49, the filtered unclassified user-specific information must have been saved 44 before any earlier classification 45.

The statistical analysis 46 described above can be carried out again for the re-classified information for drawing conclusions 47 or for further specification 48 of the classes of behaviour patterns.

In the method according to the invention, the variable or a combination of variables selected for examination can be selected as appropriate for the matter being studied. At the simplest, the variable used in the classification can be the type of the subscription contract made by the user with the operator: is it a private customer or a company. In a more complicated case, for instance when the users of the mobile phone network are classified into traditional telephone users and users who also use other services of the network, such as the short message service (SMS), the type of system service, e.g. whether it is a GSM connection or an SMS connection, can be used as the basis for classification.

If desired, the information used in compiling the statistics can be collected from many sources. That would make it possible to combine different types of information in defining the classes of behaviour patterns. Good sources for collecting information are, for example, the customer register and the databases of the network management system about connections and attempted connections in the system.

Figure 5:
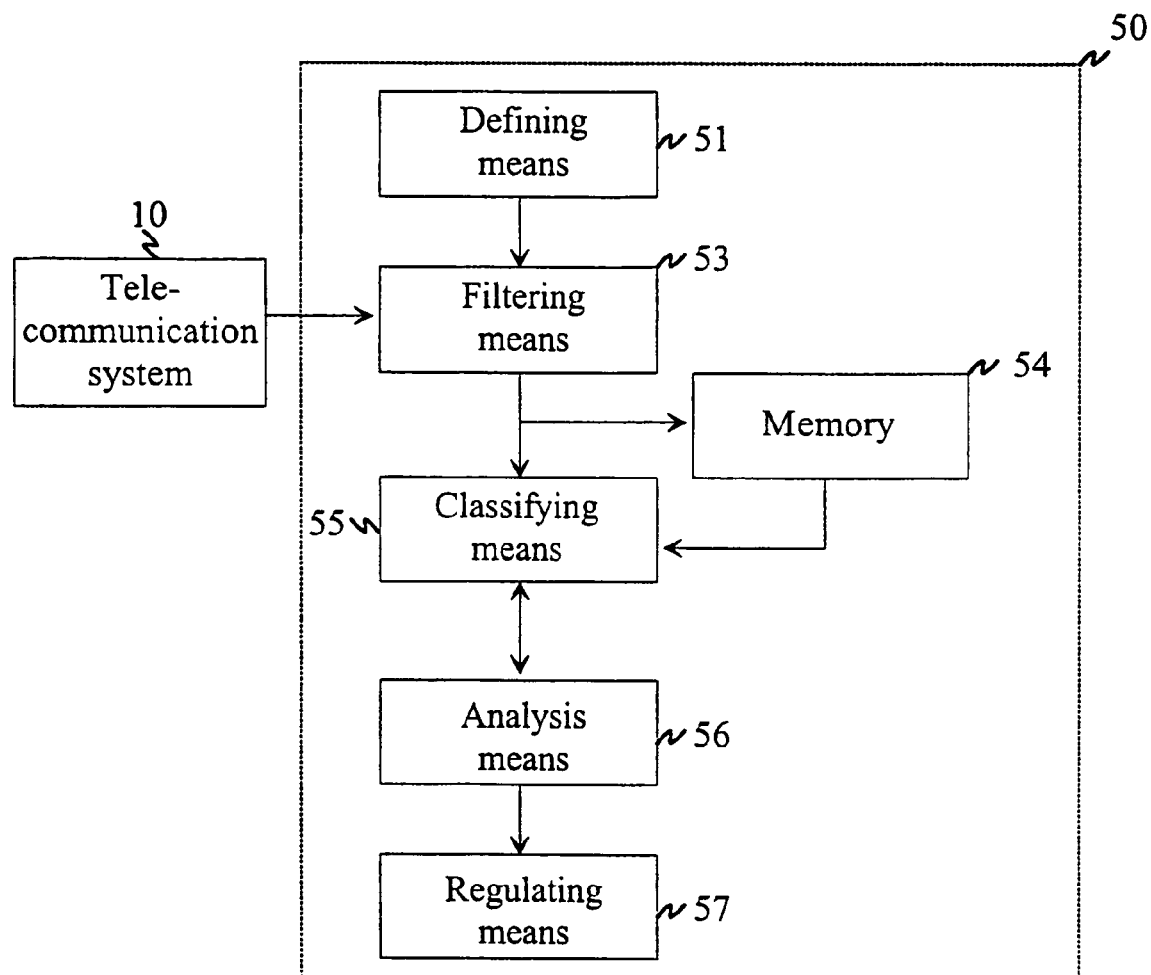
FIG. 5 depicts a system according to the invention for determining the classes of behaviour patterns of users of a telecommunication system.

FIG. 5 depicts a system 50 according to the invention for determining the behaviour patterns of the users of a telecommunication system. The system 50 comprises at least means 51 for defining at least one variable or a combination of variables, filtering means 53 for filtering user-specific information corresponding to at least one variable or a combination of variables from information received from the telecommunication system, and classifying means 55 for classifying the users on the basis of the filtered user-specific information.

To advantage, the system 50 is designed so that it can process the information received from the telecommunication system in real time.

The defining means 51 are preferably implemented so that when desired, they can also be used to define the limits of the classes of behaviour patterns, whereby the system operator can define the actual classes of the behaviour patterns to be examined.

In order to implement the preferred embodiments described above, the system 50 can also comprise at least one of the following: a memory 54 for saving the filtered user-specific information, analysis means 56 for carrying out statistical analysis, and regulating means 57 for regulating the parameters of the telecommunication system according to the results received from the analysis means 56.

Depending on the saving capacity required, the memory 54 can consist of memory circuits when relatively small amounts of information are saved, or a mass storage, such as a tape station when a larger saving capacity is needed. The memory 54 is preferably connected to the classification means 55, whereby the filtered user-specific information can be re-classified if desired, e.g. in accordance with the new classes of behaviour patterns defined on the basis of the analysis carried out with the analysis means.

As an example of the use of a solution according to the invention its is assumed that the operator wants to focus its service on a certain customer group which uses the mobile phone frequently, and typically in business centres and at airports. In that case, the operator wants to determine the limits of such interesting areas as exactly as possible, so that the quality of service for the target group could be raised to the desired level. By means of the method described above, the areas in which the intended target group uses the system can be determined in a rather simple manner.

In the first step 41, a parameter or a combination of parameters by which the target group is identified as effectively as possible is selected as the first variable to be examined. In addition, the first variable is used to define a class of behaviour patterns, which corresponds to the intended target group as closely as possible. Furthermore, a variable containing location information of the mobile station, such as the location update information of the mobile station is defined as the second variable in the first step 41.

In the second step 43, only the location update information of users according to the selected first parameter is filtered from the information 42 collected from the mobile communication system. After this, the filtered information is classified according to the defined second parameter in the third step 45. Thus areas of the mobile communication network have been classified according to the location update information of the target group.

By carrying out statistical analysis 46 on the classified material the operator can draw conclusions 47 about the required measures for improving the quality of service of the target group. For example, the operator can decide to extend the capacity of the network in areas used by the target group most frequently, so that the members of the target group would not have to suffer from problems caused by too small capacity.

The operator can use the prior art solution described above for regulating values that are essential for the quality of service, such as the QoS (Quality of Service) threshold values used for allocating resources in the GPRS system.

The solution according to the invention is not limited to the performance order used in the above examples, but the steps can also be performed in a different order if desired.

Naturally, the solution according to the invention is not limited to the examples presented above, but its details can be modified without departing from the scope defined by the attached claims.

What is claimed is:

1. A method for determining behavior patterns of users of a telecommunication system based on information collected from the telecommunication system, the method comprising:
   defining at least one variable or a combination of variables of the telecommunication system;

filtering user-specific information corresponding to the defined at least one variable or the combination of variables from the information collected from the telecommunication system; and classifying the users of the telecommunication system based on the filtered user-specific information into various classes indicative of a user's behavior patterns during use of the telecommunication system.

2. The method of claim 1, wherein said user-specific information is filtered from the information collected in real time from the telecommunication system.

3. The method of claim 1, further comprising:
saving the filtered user-specific information for later analysis.

4. The method of claim 1, further comprising:
statistically analyzing the classified information after the classification.

5. The method of claim 4, further comprising:
regulating parameters essential for the quality of service of the telecommunication system based on said statistical analysis.

6. The method of claim 4, further comprising:
drawing conclusions based on said statistical analysis, wherein the conclusions are drawn about the behavior pattern of a certain group of users in the telecommunication system.

7. The method of claim 1, wherein the classifying comprises classifying the users into the various classes indicative of a user's behavior patterns defined in connection with the definition of variables.

8. The method of claim 1, further comprising:
changing the definitions of the classes of behavior patterns used in the classification of users.

9. The method of claim 8, further comprising:
classifying said filtered user-specific information into previously presented classes of behavior patterns.

10. The method of claim 1, wherein at least one of the variables is a type of contact of the user.

11. The method of claim 1, wherein at least one of the variables is a type of system service.

12. The method of claim 1, wherein said telecommunication system is a mobile communication system.

13. A system for determining users' patterns of behavior in a telecommunication system, said system comprising:
defining means for defining at least one variable or a combination of variables of the telecommunication system;
filtering means for filtering user-specific information corresponding to the at least one variable or the combination of variables from the user-specific information received from the telecommunication system; and
classifying means for classifying users of the telecommunication system based on said filtered user-specific information into various classes indicative of a user's behavior patterns during use of the telecommunication system.

14. The system of claim 13, wherein the system is configured to process the information received in real time from the telecommunication system.

15. The system of claim 13, wherein the system comprises a memorizing means for saving said filtered user-specific information.

16. The system of claim 13, wherein the system comprises analysis means for statistically analyzing the classification of the behavior patterns of users received from the classifying means and/or for defining previously presented classes of behavior patterns.

17. The system of claim 13, wherein the system further comprises regulating means for regulating the values of parameters essential for the quality of service of the telecommunication system based on the information received from the analysis means.

18. The system of claim 13, wherein said telecommunication system is a mobile communication system.

19. A system for determining behavior patterns of users of a telecommunication system based on information collected from the telecommunication system, the system comprising:
at least one base station;
at least one mobile services switching center configured to establish a connection to a mobile station and further configured to generate connection information;
at least one network management system configured to monitor and manage an operation of the telecommunication system;
a customer register configured to receive the connection information from the at least one mobile services switching center;
a statistical unit configured to receive statistical information from the at least one network management system;
a filter configured to filter said user-specific information corresponding to at least one variable or a combination of variables from the user-specific information received from the telecommunication system, wherein said at least one variable or the combination of variables are defined in the telecommunication system; and
a classifier configured to classify users of the telecommunication system based on said filtered user-specific information into various classes indicative of a user's behavior patterns during use of the telecommunication system.

20. The system of claim 19, wherein the system is configured to process the information received in real time from the telecommunication system.

21. The system of claim 19, further comprising:
a memory configured to save said filtered user-specific information.

22. The system of claim 19, further comprising:
an analyzer configured to analyze at least one of statistical analysis of the classification of the behavior patterns of users received from the classifier and defining previously presented classes of behavior patterns.

23. The system of claim 19, further comprising:
a regulator configured to regulate the values of parameters essential for the quality of service of the telecommunication system on the basis of the information received from the analysis means.

24. The system of claim 19, wherein said telecommunication system is a mobile communication system.

* * * * *